US011550039B2

United States Patent
Gassend et al.

(10) Patent No.: US 11,550,039 B2
(45) Date of Patent: Jan. 10, 2023

(54) MIRROR ASSEMBLY

(71) Applicant: Waymo LLC, Mountain View, CA (US)

(72) Inventors: Blaise Gassend, East Palo Alto, CA (US); Pierre-Yves Droz, Mountain View, CA (US); Benjamin T. Ingram, Santa Clara, CA (US)

(73) Assignee: Waymo LLC, Mountain View, CA (US)

( * ) Notice: Subject to any disclaimer, the term of this patent is extended or adjusted under 35 U.S.C. 154(b) by 158 days.

(21) Appl. No.: 17/173,128

(22) Filed: Feb. 10, 2021

(65) Prior Publication Data

US 2021/0165082 A1 Jun. 3, 2021

Related U.S. Application Data

(63) Continuation of application No. 16/229,182, filed on Dec. 21, 2018, now Pat. No. 10,948,573, which is a
(Continued)

(51) Int. Cl.
*G02B 26/08* (2006.01)
*G01S 7/481* (2006.01)
(Continued)

(52) U.S. Cl.
CPC .......... *G01S 7/4817* (2013.01); *G01S 7/4814* (2013.01); *G01S 7/4816* (2013.01); *G01S 17/42* (2013.01);
(Continued)

(58) Field of Classification Search
CPC ...... G01S 7/4817; G01S 7/4816; G01S 17/89; G01S 17/42; G01S 7/4814; G02B 26/122; G02B 26/125
(Continued)

(56) References Cited

U.S. PATENT DOCUMENTS

| 5,748,356 A | 5/1998 | Park et al. |
| 6,219,168 B1 | 4/2001 | Wang |

(Continued)

FOREIGN PATENT DOCUMENTS

| CN | 16411409 | 7/2005 |
| CN | 101469969 | 7/2009 |

(Continued)

OTHER PUBLICATIONS

European Patent Office, Extended European Search Report dated Jun. 16, 2020, issued in connection with European Patent Application No. 17884991.5, 8 pages.
(Continued)

*Primary Examiner* — Euncha P Cherry
(74) *Attorney, Agent, or Firm* — McDonnell Boehnen Hulbert & Berghoff LLP

(57) ABSTRACT

The present disclosure relates to optical systems, specifically light detection and ranging (LIDAR) systems. An example optical system includes a laser light source operable to emit laser light along a first axis and a mirror element with a plurality of reflective surfaces. The mirror element is configured to rotate about a second axis. The plurality of reflective surfaces is disposed about the second axis. The mirror element and the laser light source are coupled to a base structure, which is configured to rotate about a third axis. While the rotational angle of the mirror element is within an angular range, the emitted laser light interacts with both a first reflective surface and a second reflective surface of the plurality of reflective surfaces and is reflected into the environment by the first and second reflective surfaces.

20 Claims, 11 Drawing Sheets

Related U.S. Application Data continuation-in-part of application No. 15/951,491, filed on Apr. 12, 2018, now Pat. No. 10,191,146, which is a continuation of application No. 15/383,842, filed on Dec. 19, 2016, now Pat. No. 10,001,551.

(60) Provisional application No. 62/755,398, filed on Nov. 2, 2018.

(51) Int. Cl.
*G01S 17/42* (2006.01)
*G02B 26/12* (2006.01)
*G01S 17/89* (2020.01)

(52) U.S. Cl.
CPC ............ *G01S 17/89* (2013.01); *G02B 26/122* (2013.01); *G02B 26/125* (2013.01)

(58) Field of Classification Search
USPC ...................................................... 359/205.1
See application file for complete search history.

(56) References Cited

U.S. PATENT DOCUMENTS

| | | | |
|---|---|---|---|
| 6,542,227 | B2 | 4/2003 | Jamieson et al. |
| 6,650,407 | B2 | 11/2003 | Jamieson et al. |
| 8,810,796 | B2 | 8/2014 | Hays et al. |
| 9,019,503 | B2 * | 4/2015 | Ouyang ................. G01N 21/49 356/445 |
| 9,086,273 | B1 | 7/2015 | Gruver et al. |
| 9,086,488 | B2 | 7/2015 | Tchoryk, Jr. et al. |
| 10,001,551 | B1 | 6/2018 | Gassend et al. |
| 2004/0212863 | A1 | 10/2004 | Schanz et al. |
| 2006/0158713 | A1 | 7/2006 | Takeuchi et al. |
| 2007/0201027 | A1 | 8/2007 | Doushkina et al. |
| 2011/0239421 | A1 | 10/2011 | Tertitski et al. |
| 2013/0182245 | A1 | 7/2013 | Yasunaga et al. |
| 2014/0034817 | A1 | 2/2014 | Nakamura et al. |
| 2014/0204385 | A1 | 7/2014 | Ouyang et al. |
| 2018/0231644 | A1 | 8/2018 | Gassend et al. |
| 2018/0313941 | A1 | 11/2018 | Wang et al. |
| 2019/0154808 | A1 | 5/2019 | Gassend et al. |

FOREIGN PATENT DOCUMENTS

| | | |
|---|---|---|
| JP | 2017156141 | 9/2017 |
| WO | 2000/020912 | 4/2000 |

OTHER PUBLICATIONS

International Searching Authority, International Search Report and Written Opinion dated Feb. 13, 2020, issued in connection with International Patent Application No. PCT/US2019/057843, filed on Oct. 24, 2019, 11 pages.

International Searching Authority, International Search Report and Written Opinion dated Apr. 16, 2018, issued in connection with International Patent Application No. PCT/US2017/067037, filed on Dec. 18, 2017, 9 pages.

* cited by examiner

MIRROR ASSEMBLY

CROSS-REFERENCE TO RELATED APPLICATIONS

The present application is a continuation of U.S. application Ser. No. 16/229,182 filed on Dec. 21, 2018, which is a continuation-in-part of U.S. application Ser. No. 15/951,491 filed on Apr. 12, 2018, which is a continuation of U.S. application Ser. No. 15/383,842 filed on Dec. 19, 2016; and the present application also claims the benefit of U.S. Provisional Application No. 62/755,398 filed on Nov. 2, 2018, the contents of each of which are hereby incorporated by reference.

BACKGROUND

Unless otherwise indicated herein, the materials described in this section are not prior art to the claims in this application and are not admitted to be prior art by inclusion in this section.

Light detection and ranging (LIDAR) systems utilize laser light to provide information about objects in an environment. For example, LIDAR systems can provide map data about a physical environment. Some LIDAR systems include a scanning assembly configured to direct the laser light around the environment. Such scanning assemblies may include one or more moving mirrors.

SUMMARY

The present disclosure generally relates to an optical system with a moving mirror assembly. In some embodiments, the moving mirror assembly may be configured to rotate so as to direct laser light around an environment of the optical system. As described herein, some arrangements of the laser light source and the mirror assembly may provide a very broad scanning angle (e.g., greater than 230 degrees), which may allow for more comprehensive object mapping within a given environment.

In a first aspect, a system is provided. The system includes a laser light source operable to emit laser light along a first axis. The system also includes a mirror element with a plurality of reflective surfaces. The mirror element is configured to rotate about a second axis. The plurality of reflective surfaces is disposed about the second axis. The mirror element and the laser light source are coupled to a base structure. The base structure is configured to rotate about a third axis. The system further includes a controller configured to carry out operations. The operations include causing the mirror element to rotate about the second axis. The rotation about the second axis includes a first angular range and a second angular range. The operations include causing the laser light source to emit laser light along the first axis such that the emitted laser light interacts with the mirror element. While the rotational angle of the mirror element is within the first angular range, the emitted laser light interacts with a first reflective surface of the plurality of reflective surfaces and is reflected into an environment by the first reflective surface. While the rotational angle of the mirror element is within the second angular range, the emitted laser light interacts with both the first reflective surface and a second reflective surface of the plurality of reflective surfaces and is reflected into the environment by the first and second reflective surfaces. The operations further include causing the base structure to rotate about the third axis.

In a second aspect, an optical system is provided. The optical system includes a laser light source operable to emit laser light along a first axis. The optical system also includes a mirror element having a plurality of reflective surfaces. The mirror element is configured to rotate about a second axis. The rotation about the second axis includes a first angular range and a second angular range. The plurality of reflective surfaces is disposed about the second axis. The mirror element and the laser light source are coupled to a base structure. The base structure is configured to rotate about a third axis. While the rotational angle of the mirror element is within the first angular range, the emitted laser light interacts with a first reflective surface of the plurality of reflective surfaces and is reflected into an environment by the first reflective surface. While the rotational angle of the mirror element is within the second angular range, the emitted laser light interacts with both the first reflective surface and a second reflective surface of the plurality of reflective surfaces and is reflected into the environment by the first and second reflective surfaces. The optical system includes at least one beam stop. The at least one beam stop is configured to prevent laser light from being emitted into the environment at angles outside an emission angle range.

Other aspects, embodiments, and implementations will become apparent to those of ordinary skill in the art by reading the following detailed description, with reference where appropriate to the accompanying drawings.

DETAILED DESCRIPTION

Figure 1:
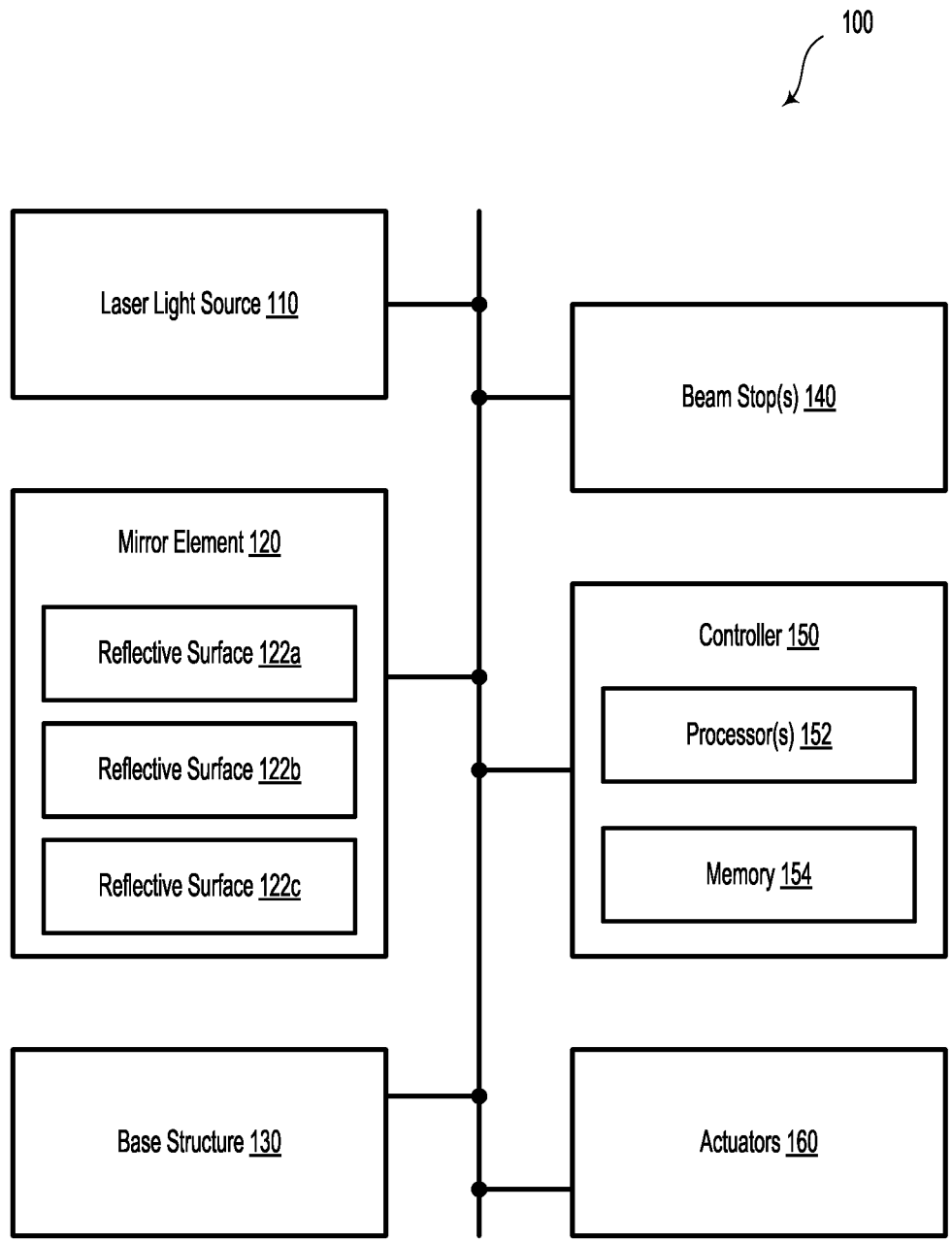
FIG. 1 illustrates a system, according to an example embodiment.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. Overview

A light distance and ranging system (e.g., a LIDAR) may include a laser light source configured to illuminate a mirror along a first axis. The mirror may be configured to rotate about a second axis, in which the second axis is perpendicular to the first axis. In an example embodiment, the mirror may include three mirror surfaces arranged in an equilateral triangle arrangement. While rotating about the second axis, the mirror may be configured to direct the light from the laser light source into an environment of the system over a wide field of view (e.g., greater than 230 degrees about the second axis). By directing the light over such a large angular field of view, the LIDAR system may provide ranging information within a larger three-dimensional volume.

In some embodiments, the laser light source may illuminate two of the three sides of the mirror at the same time. In such situations, beam stops may be positioned to prevent multiple simultaneous readings/signals. In an example embodiment, the mirror may be configured to provide interlaced scanning of the environment around the LIDAR system. For instance, the mirror, its operating characteristics (e.g., rate of rotation), and a pulse rate of the laser light source may provide a first set of scan locations during a first scan. Subsequently, by continuing to rotate the mirror while keeping the other operating characteristics the same, the laser light may be directed towards a second set of scan locations. In some embodiments, the first set of scan locations may be interleaved with the second set of scan locations such that the laser light emitted from the laser light source is provided in an evenly distributed fashion (e.g., in angle about the second axis).

In an example embodiment, the mirror may rotate about the second axis at a rotational frequency, $\Omega$, which could be about 30,000 revolutions per minute or 30 kRPM. Furthermore, the mirror and the laser light source may rotate about a third axis at a rotational frequency, $\Phi$, which could be about 600 RPM. However, other rotational frequencies are possible. In an example embodiment, an interlaced condition may occur when $\Omega/\Phi=2N+1$, where N is an integer.

II. Example Systems

FIG. 1 illustrates a system 100, according to an example embodiment. The system 100 may be, or may represent a portion of, a light detection and ranging (LIDAR) system. In example embodiments, system 100 may be a LIDAR system configured to provide information about an environment. For example, system 100 may be a LIDAR system for an autonomous vehicle, such as a self-driving car or an autonomous aerial vehicle.

System 100 includes a laser light source 110. In example embodiments, the laser light source 110 may be operable to emit laser light along a first axis. The laser light source 110 could be any source of laser light configured to provide substantially collimated and/or coherent light. For instance, the laser light source 110 could be a semiconductor waveguide laser, a fiber laser, an excimer laser, or another type of laser system.

In example embodiments, the light emitted from the laser light source 110 may include pulses of laser light. For instance, the laser light pulses may have durations in the 1-100 nanosecond range. However, other laser light pulse durations are possible.

The laser light emitted by the laser light source 110 may have an emission wavelength within the infrared (IR) wavelength range, however other wavelengths are contemplated. For example, the emission wavelength could be in the visible wavelength spectrum or the ultraviolet (UV) wavelength spectrum. In an example embodiment, the emission wavelength may be about 905 nanometers. Alternatively, the emission wavelength could be about 1.55 microns.

System 100 also includes a mirror element 120 with a plurality of reflective surfaces 122. Specifically, the reflective surfaces 122 may be configured to reflect light at, or substantially at, the emission wavelength. In some embodiments, the reflective surfaces 122 may be formed from, and/or coated with, a metal, such as aluminum, gold, silver, or another reflective material. Additionally or alternatively, the reflective surfaces 122 may include a high reflectance (HR) coating. In an example embodiment, the HR coating may include a dielectric stack configured to reflect incident light at the emission wavelength. The dielectric stack may include, for example, a periodic layer system alternating between two materials having different indices of refraction. Other types of HR coatings are possible and contemplated herein.

In some example embodiments, the mirror element 120 may include three reflective surfaces 122a, 122b, and 122c. Mirror elements 120 having more or less reflective surfaces 122 are contemplated. For example, the mirror element 120 could include four or more reflective surfaces.

The mirror element 120 is configured to rotate about a second axis. Furthermore, in some embodiments, the plurality of reflective surfaces may be disposed about the second axis. In such scenarios, the mirror element 120 may be prism-shaped and each facet of the prism shape may be a reflective surface 122. In other words, the reflective surfaces 122a, 122b, and 122c may be arranged symmetrically about the second axis such that the mirror element 120 has a triangular prism shape. As an example, the first axis and the second axis may be perpendicular with respect to one another, however other arrangements of the first axis and the second axis are contemplated. In some embodiments, the first axis may intersect with the second axis.

System 100 additionally includes a base structure 130. The mirror element 120 and the laser light source 110 may be coupled to the base structure 130. In some embodiments, the base structure 130 may be configured to rotate about a third axis. While a variety of arrangements of the third axis are contemplated, an example embodiment includes the third axis being parallel to or collinear with the first axis.

System 100 further includes one or more beam stops 140. The beam stop(s) 140 may be configured to prevent laser light from being reflected into the environment at angles outside a predetermined emission angle range. Additionally or alternatively, beam stop(s) 140 may be positioned so as to prevent multiple simultaneous readings/signals. In example embodiments, the emission angle range could be expressed as the range of angles with respect to the mirror element 120 that may receive laser light emission from system 100. In other words, the emission angle range may represent the angles from which ranging information may be obtained from the environment around the system 100. In some embodiments, the emission angle range may be defined with respect to the second axis. In such scenarios, the emission angle range may be greater than 230 degrees.

The system 100 includes a controller 150 configured to carry out operations. In example embodiments, the controller 150 may include one or more logic blocks, a programmable logic device (PLD), a field programmable gate array (FPGA), and/or an application-specific integrated circuit (ASIC). Other types of controller circuits are contemplated in the present disclosure. In some embodiments, the controller 150 may include one or more processors 152 and a memory 154. In such scenarios, the processor(s) 152 may be configured to execute instructions stored in the memory 154 so as to carry out the operations.

The operations include causing the mirror element 120 to rotate about the second axis. As an example, the mirror element 120 may rotate about the second axis at rotational frequency $\Omega$. The rotation about the second axis includes a first angular range and a second angular range. In some embodiments, the mirror element 120 may rotate about the second axis at a rotational frequency of about 30 kRPM. Other rotational frequencies of mirror element 120 are possible. For example, the mirror element 120 may rotate about the second axis within a rotational frequency range between 100 RPM and 100 kRPM.

The operations also include causing the laser light source 110 to emit laser light along the first axis such that the emitted laser light interacts with the mirror element 120.

The operations additionally include, while the rotational angle of the mirror element 120 is within the first angular range, causing the emitted laser light to interact with a first reflective surface (e.g., 122a) of the plurality of reflective surfaces 122. Upon interacting with the first reflective surface, the reflected laser light is reflected into an environment by the first reflective surface.

The operations also include, while the rotational angle of the mirror element is within the second angular range, causing the emitted laser light to interact with both the first reflective surface (e.g., 122a) and a second reflective surface (e.g., 122b) of the plurality of reflective surfaces 122. The reflected laser light is reflected into the environment by the first and second reflective surfaces.

The operations also include causing the base structure 130 to rotate about the third axis. The base structure may rotate about the third axis at rotational frequency $\Phi$. As an example, the base structure 130 may rotate about the third axis at a rotational frequency of about 600 RPM. Other rotational frequencies are possible. For instance, the base structure 130 may rotate about the third axis at rotational frequencies between 10 RPM and 10 kRPM.

The system 100 also includes one or more actuators 160. The actuators 160 may include DC motors configured to rotate the mirror element 120 and/or the base structure 130. Furthermore, the actuator 160 may include an actuator to adjust a position and/or angle of the laser light source 110. In some embodiments, the actuators 160 may include one or more actuators configured to adjust a position and/or angle of the beam stop(s) 140. That is, in such a scenario, the actuators 160 may move the beam stops 140 so as to adjust the emission angle range and/or avoid multiple simultaneous readings.

Optionally, the operations may also include, while the rotational angle of the mirror element is within a third angular range, causing the emitted laser light to interact with a third reflective surface (e.g., 122c) of the plurality of reflective surfaces. In such scenarios, the reflected laser light may be reflected into the environment by the third reflective surface.

In some embodiments, the operations further include operating the system in an interlaced condition. In such scenarios, the interlaced condition may occur when $\Omega/\Phi=2N+1$, where N is an integer. An interlaced condition may provide a desired laser scanning pattern for scanning the three-dimensional environment around the system 100. Namely, the desired laser scanning pattern may include overlapping scanning areas and/or may provide for less time between subsequent scans for a given location within the environment. Reducing the time between subsequent scans may provide better safety as more up-to-date information may be available about the environment, such as map data and/or object data.

In some embodiments, causing the laser light source 110 to emit laser light may include causing the laser light source to emit laser light pulses based on at least one of rotational frequency $\Omega$ or rotational frequency $\Phi$.

Figure 2A:
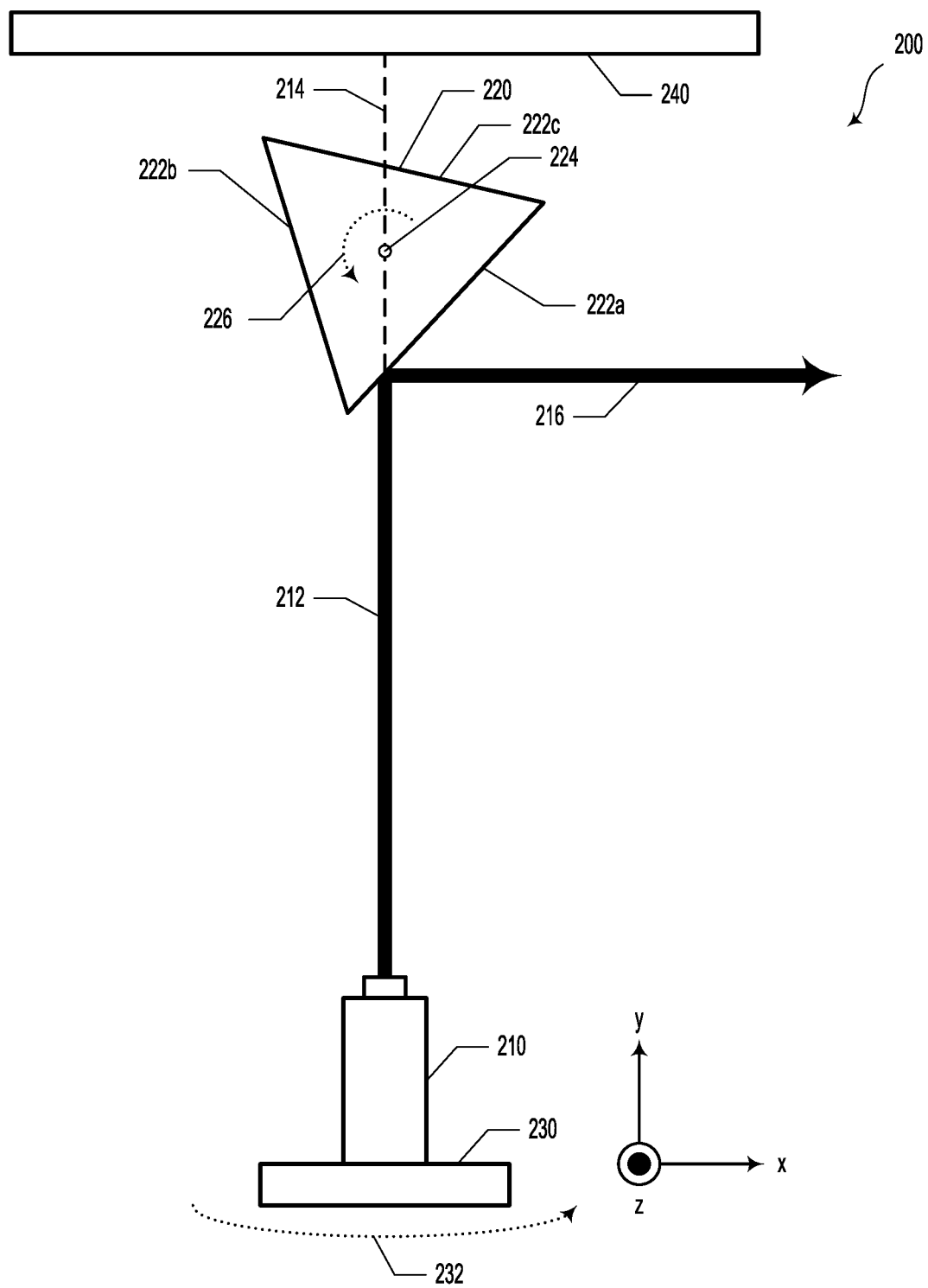
FIG. 2A illustrates an optical system, according to an example embodiment.
Figure 2B:
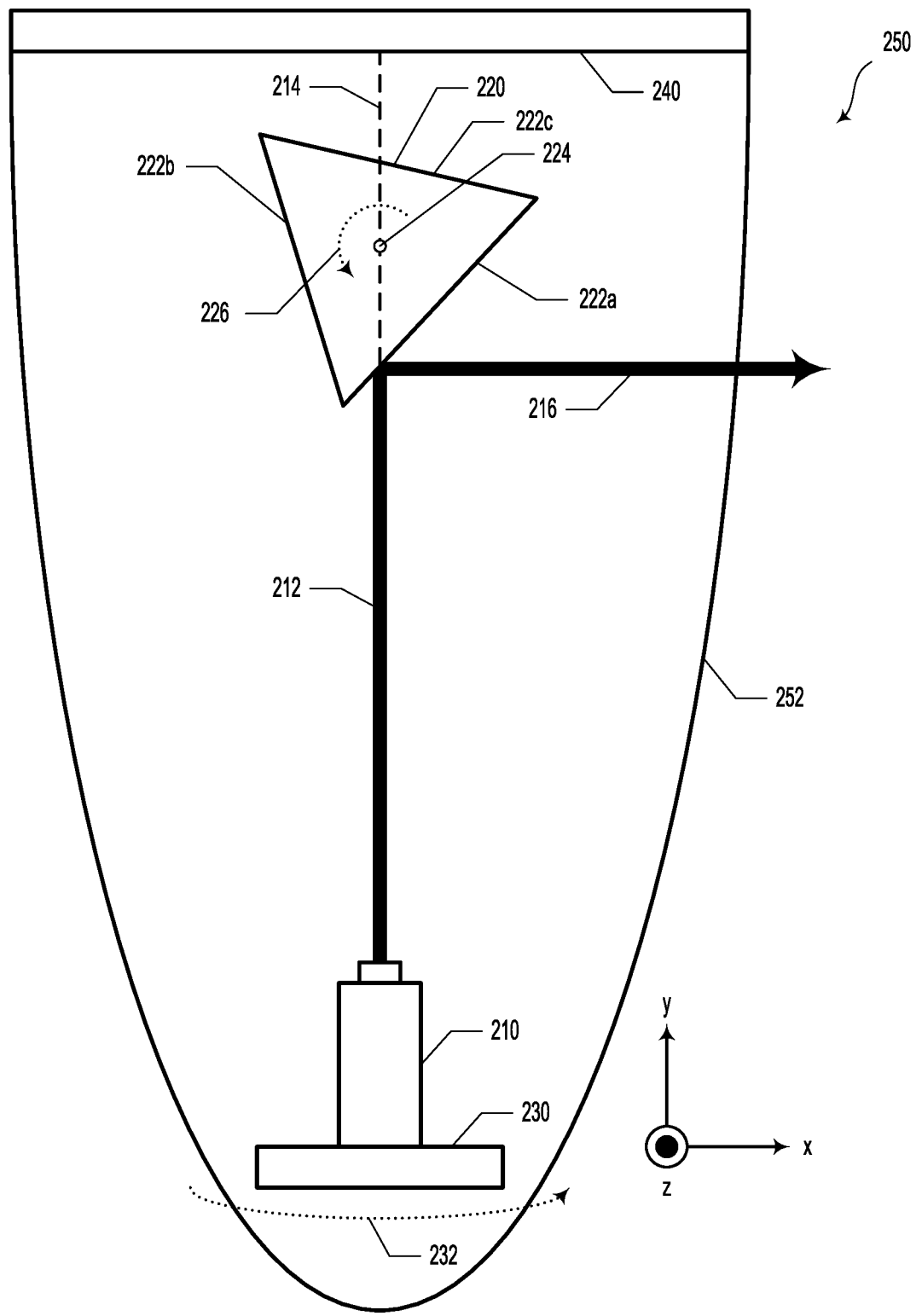
FIG. 2B illustrates an optical system, according to an example embodiment.
Figure 2C:
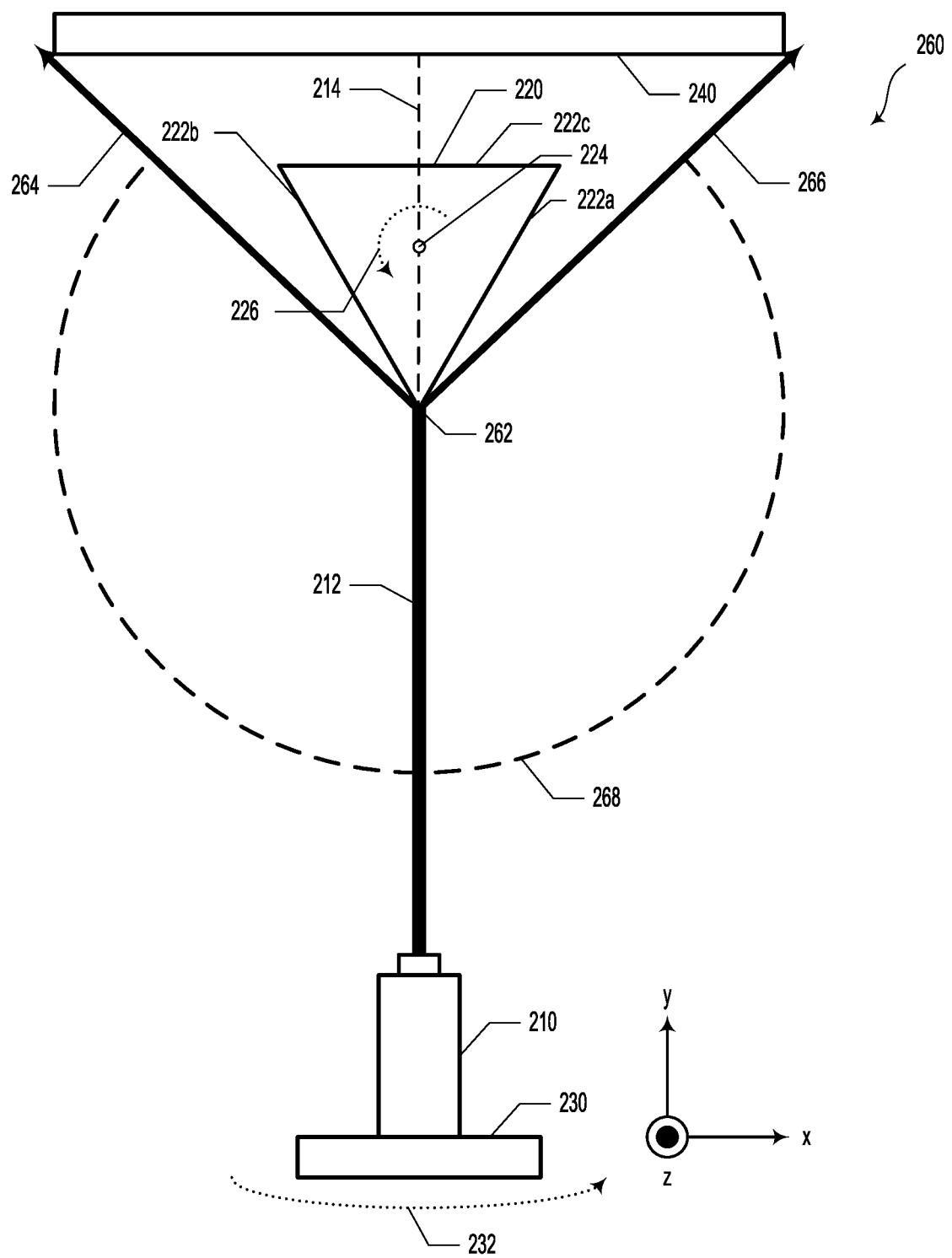
FIG. 2C illustrates an optical system, according to an example embodiment.

FIGS. 2A, 2B, and 2C illustrate optical systems according to various example embodiments. The optical systems described in relation to FIGS. 2A, 2B, and 2C may be similar or identical to the system 100 illustrated and described with regard to FIG. 1. FIG. 2A illustrates an optical system 200, according to an example embodiment. In some embodiments, optical system 200 may be part of a laser-based distance and ranging (LIDAR) system.

The optical system 200 includes a laser light source 210 that may be operable to emit laser light along a first axis 214. As illustrated in FIG. 2A, the first axis 214 may be along (or parallel to) the y-direction. As such, the laser light source 210 may emit laser light 212 along the y-axis. As described with regard to laser light source 110, laser light source 210 may include a semiconductor laser, a fiber laser, or another type of light source configured to provide a coherent pulse of light.

The optical system 200 also includes a mirror element 220. The mirror element 220 includes a plurality of reflective surfaces 222a, 222b, and 222c. The mirror element 220 is configured to rotate about a second axis 224. As illustrated in FIG. 2A, the second axis 224 may be parallel to the z direction. The plurality of reflective surfaces 222 is disposed about the second axis 224. For example, the plurality of reflective surfaces 222 may include three reflective surfaces (222a, 222b, and 222c) arranged symmetrically about the second axis such that the mirror element 220 has a triangular prism shape.

In some embodiments, the first axis (e.g., the axis along which laser light 212 is emitted) may intersect the second axis 224. Furthermore, the first axis 214 may be perpendicular to the second axis 224.

In example embodiments, the optical system 200 also includes a mirror element actuator configured to rotate the mirror element 220 about the second axis at rotational frequency $\Omega$. The mirror element actuator may include a stepper motor, a brushed or brushless DC motor, or another type of rotational actuator. In other words, the mirror element actuator may be configured to rotate the mirror element 220 in a desired direction 226 at a desired rotational frequency $\Omega$.

Although not expressly depicted in FIG. 2A, the mirror element 220 and the laser light 210 source are coupled to a base structure 230. In some embodiments, the base structure 230 is configured to rotate about a third axis. Furthermore, in an example embodiment, the third axis may be coaxial with the first axis 214 (e.g., the y-axis). In some embodiments, the optical system 200 includes a base structure actuator configured to rotate the base structure in a desired direction 232 about the third axis at rotational frequency Φ. The base structure actuator may include a rotational actuator such as a stepper motor or a brushed or brushless DC motor.

The optical system 200 also includes at least one beam stop 240. The beam stop 240 may include one or more beam dumps, optically opaque materials, and/or beam blocking materials. The beam stop 240 may be formed from a polymer, metal, fabric, or other materials. The at least one beam stop 240 may be configured to prevent laser light from being emitted into the environment at angles outside an emission angle range. In an example embodiment, the emission angle range may be greater than 230 degrees about the second axis 224. As described herein, the beam stop 240 may be positioned to prevent multiple simultaneous readings/signals.

In example optical systems, while a rotational angle of the mirror element 220 is within a first angular range, the emitted laser light 212 interacts with a first reflective surface 222a of the plurality of reflective surfaces 222 and is reflected as reflected light 216 into an environment by the first reflective surface 222a. In some embodiments, the emitted laser light 212 may have a beam width, such as 2 millimeters. Other beam widths are possible.

Furthermore, in some embodiments, while the rotational angle of the mirror element 220 is within a second angular range, the emitted laser light 212 interacts with both the first reflective surface 222a and a second reflective surface 222b of the plurality of reflective surfaces 222. In such a scenario, the emitted laser light 212 is reflected as reflected light 216 into the environment by the first and second reflective surfaces 222a and 222b. Put another way, as described above, the emitted laser light 212 may have a beam width of 2 millimeters. A first portion (e.g., a first half of the beam width) of the emitted laser light 212 may interact with the first reflective surface 222a and a second portion (e.g., a second half of the beam width) of the emitted laser light 212 may interact with the second reflective surface 222b.

FIG. 2B illustrates an optical system 250, according to an example embodiment. Optical system 250 may be similar or identical to optical system 200, illustrated and described in reference to FIG. 2A. Optical system 250 may include a housing 252. The housing 252 may be optically transparent to the wavelength(s) of the emitted light 212 and reflected light 216. For example, housing 252 may be more than 90% transparent to the reflected light 216. In example embodiments, the housing 252 may be coupled to the beam stop 240 and the mirror element 220.

FIG. 2C illustrates an optical system 260, according to an example embodiment. The optical system 260 may be similar or identical to optical systems 200 and 250 as illustrated and described in reference to FIGS. 2A and 2B. In an example embodiment, the mirror element 220 may be oriented at a given angle with respect to the second axis 224 such that incident laser light 212 interacts with two reflective surfaces of the mirror element 220. That is, laser light 212 may interact with first reflective surface 222a and second reflective surface 222b. The laser light 212 may be reflected in a first portion as reflected light 264 and in a second portion as reflected light 266. The range of angles between reflected light 264 and reflected light 266 may define an emission angle range 268. The emission angle range 268 may be more than 230 degrees.

Figure 3A:
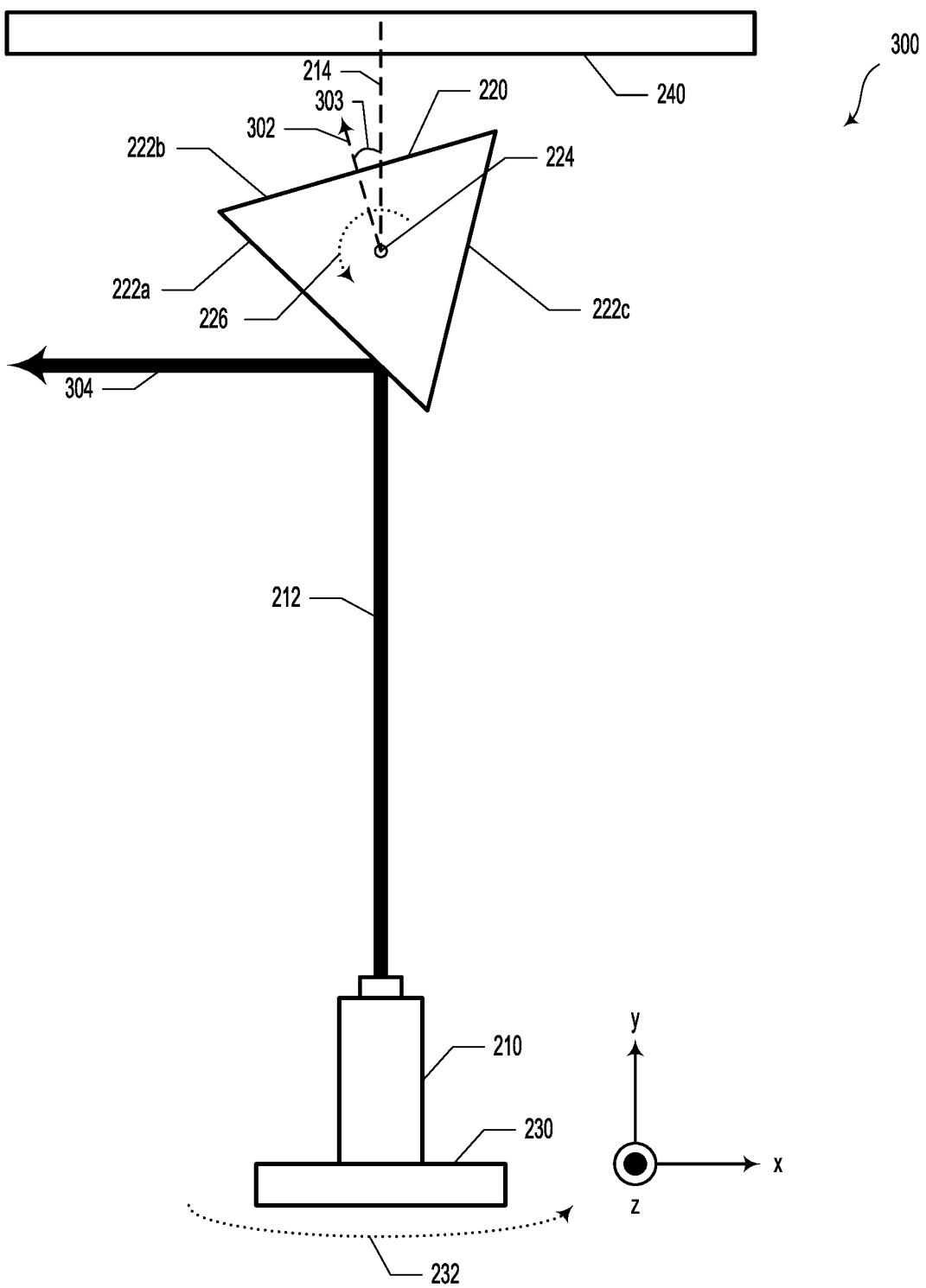
FIG. 3A illustrates an optical system, according to an example embodiment.
Figure 3B:
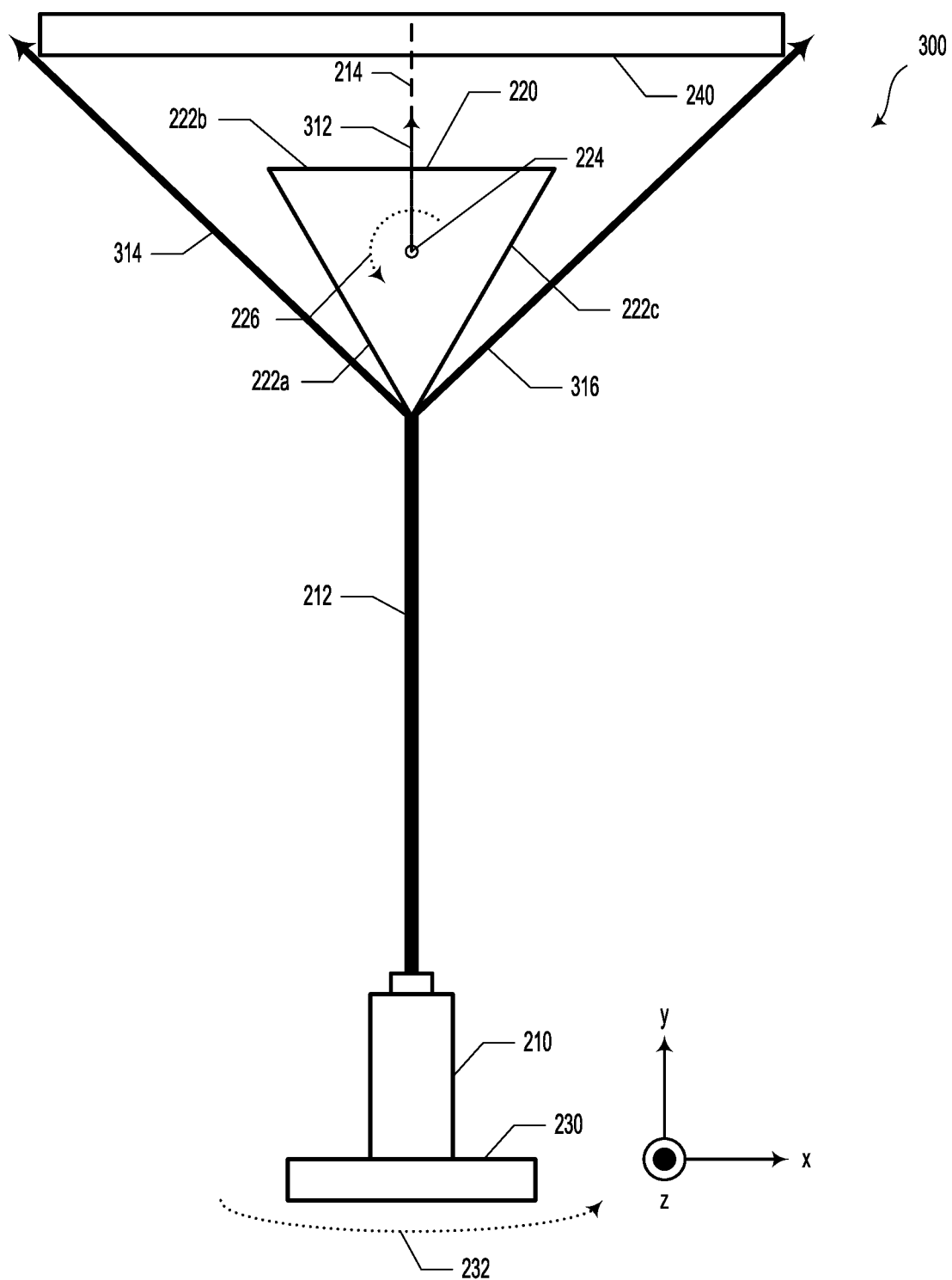
FIG. 3B illustrates an optical system, according to an example embodiment.

FIGS. 3A and 3B illustrate two different orientations of the mirror element 220 in optical system 300. Optical system 300 may be similar or identical to optical systems 200, 250, and 260 as illustrated and described with reference to FIGS. 2A, 2B, and 2C.

Namely, as illustrated in FIG. 3A, the mirror element 220 may be oriented such that an angle 303 between reference marker 302 and first axis 214 is approximately 15 degrees. In such a scenario, laser light 212 emitted from the laser light source 210 may interact with reflective surface 222a to form reflected light 304. For example, upon interacting with the reflective surface 222a, the reflected light 304 may be directed at a +90 degree angle with respect to first axis 214.

As illustrated in FIG. 3B, the mirror element 220 may be oriented such that reference marker 312 is oriented along first axis 214. In such a scenario, laser light 212 emitted from the laser light source 210 may interact with both reflective surface 222a and reflective surface 222c to provide two different reflected light rays. For example, upon interacting with reflective surface 222a and reflective surface 222c, the emitted laser light 212 may be reflected as reflected light 314 and reflected light 316. In some embodiments, an emission angle range between reflected light 314 and reflected light 316 could be more than 230 degrees.

Figure 3C:
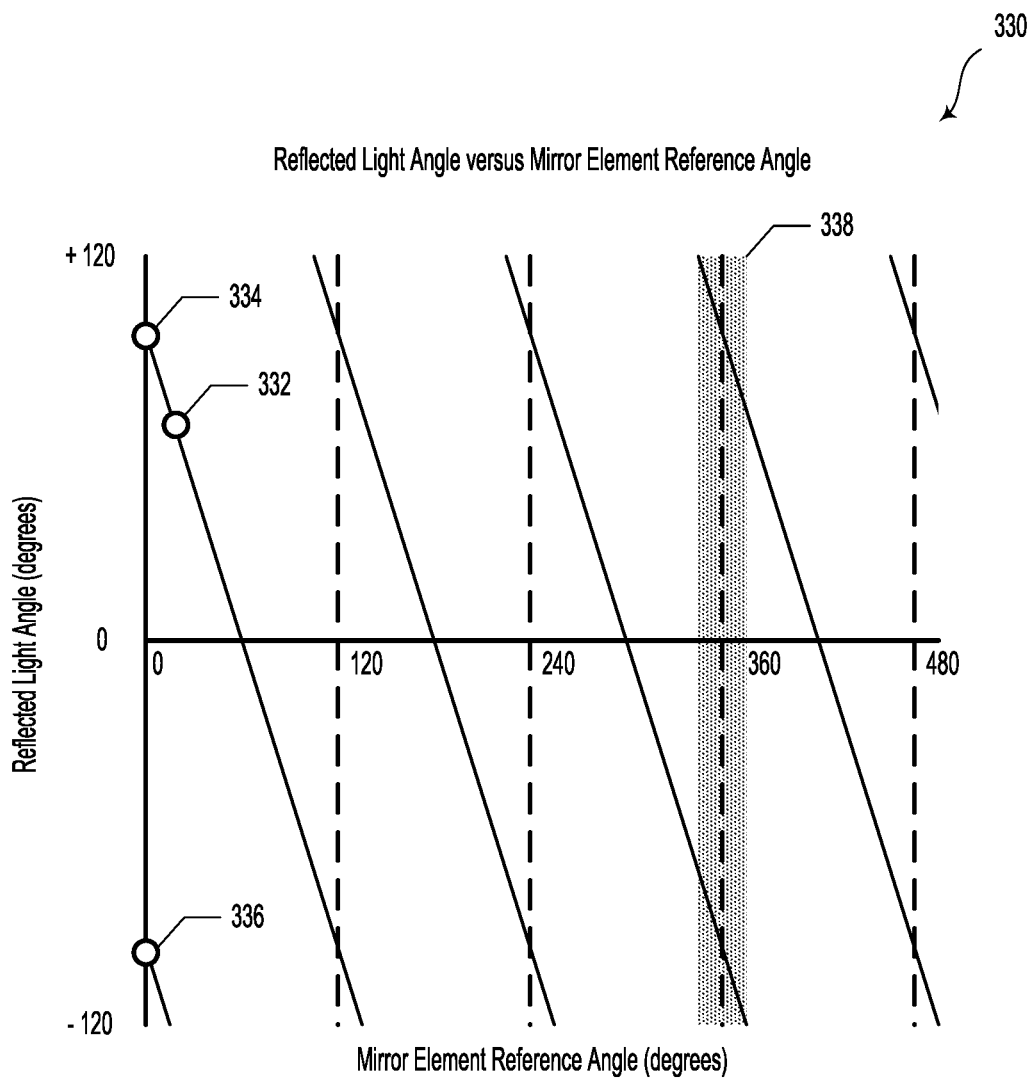
FIG. 3C illustrates a reflected light angle versus mirror element reference angle graph, according to an example embodiment.

FIG. 3C illustrates a reflected light angle versus mirror element reference angle graph 330, according to an example embodiment. The graph 330 shows how the reflected light angle changes as the mirror element 220 rotates about the second axis 224. In example embodiments, the reflected light angle may be defined as an angle between the reflected light ray (e.g., reflected light 304) and the first axis 214. The graph 330 illustrates the three-fold symmetry when the mirror element 220 is shaped like a triangular prism. It will be understood that if the mirror element 220 takes on a different shape (e.g., a rectangular solid), the angle symmetry and emission angle range may change accordingly.

Graph point 332 illustrates the scenario described in FIG. 3A. Namely, when the mirror element reference angle 303 is approximately 15 degrees, the reflected light angle of reflected light 304 may be approximately +90 degrees.

Furthermore, graph points 334 and 336 illustrate the scenario described with reference to FIG. 3B. Namely, when the mirror element reference angle is zero degrees, emission light 212 may be reflected via the two reflective surfaces 222a and 222b. In such a scenario, reflected light 314 may relate to graph point 334 (e.g., reflected light angle of +115 degrees) and reflected light 316 may relate to graph point 336 (e.g., reflected light angle of −115 degrees). It will be understood that graph 330 illustrates an example embodiment and that many other reflected light angle and mirror element reference angle relationships are possible. All such other relationships are contemplated herein.

In some embodiments, as illustrated in graph 330, emission light may be reflected in two different directions within an overlap range. As an example, overlap range 338 may represent a mirror element reference angle range over which the emission light is reflected in different directions. This overlap range 338 represents a range of angles of the mirror element 220 in which the laser light interacts with two reflective surfaces of the mirror element 220. Outside of this overlap range 338, the laser light interacts with only one reflective surface of the mirror element 220. This overlap range 338 may repeat based on symmetry of the mirror element 220. In graph 330, the overlap range 338 could be approximately 10 degrees wide, but other overlap ranges are possible. In some embodiments, the overlap range 338 may be adjusted based on the emission beam spot size, mirror element facet geometry, and/or beam stop position.

Figure 3D:
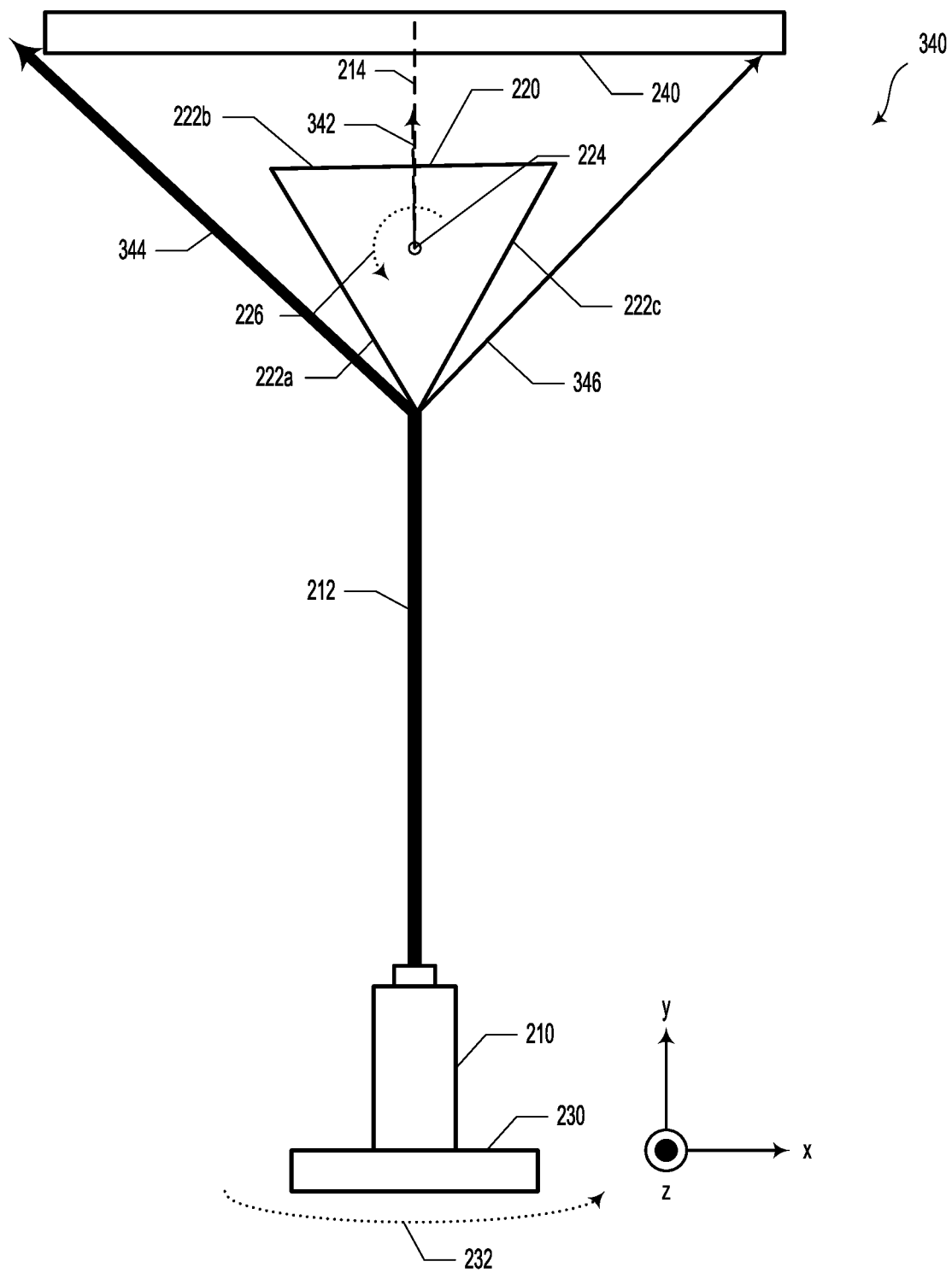
FIG. 3D illustrates an optical system, according to an example embodiment.

FIG. 3D illustrates an optical system 340, according to an example embodiment. Specifically, FIG. 3D illustrates a further possible orientation of the mirror element 220. For example, mirror element 220 may rotate counterclockwise with respect to the scenario illustrated in FIG. 3B. That is, the mirror element 220 may be oriented such that reference marker 342 is oriented approximately 1 degree counterclockwise with respect to the first axis 214. In such a scenario, laser light 212 emitted from the laser light source 210 may interact with both reflective surface 222a and reflective surface 222c to provide two different reflected light rays 344 and 346. However, in contrast to FIG. 3B, the reflected light rays 344 and 346 need not be reflected at the same angle with respect to the first axis 214 and need not have a similar beam width or beam size. For example, upon interacting with reflective surface 222a and reflective surface 222c, the emitted laser light 212 may be reflected as reflected light 344 and reflected light 346. In such a scenario, based at least on a larger portion of laser light 212 interacting with reflective surface 222a, reflected light 344 may have a larger beam size. Conversely, reflected light 346 may have a smaller beam size because a smaller portion of laser light 212 interacts with reflective surface 222c. Furthermore, based on the position of beam stop 240, reflected light 344 may be emitted into the environment around the optical system 340 whereas reflected light 346 may be "stopped," absorbed, or otherwise attenuated by the beam stop 240.

While FIGS. 2A, 2B, 2C, 3A, 3B, and 3D illustrate laser light 212 as having a certain beam width, it will be understood that laser light 212 may have a beam width that is larger or smaller in relation to the mirror element 220. In example embodiments, the laser light 212 may have a beam width that is a larger fraction of the mirror size. In such scenarios, in reference to FIG. 3C, a full mirror revolution may include a larger angular range where the laser light 212 is split into two reflected beams.

Furthermore, while FIGS. 2A, 2B, 2C, 3A, 3B, and 3D illustrate laser light source 210 as being arranged so as to emit laser light 212 along a first axis 214 that intersects the second axis 224, other arrangements are possible. For example, in some embodiments, laser light source 210 may be arranged so as to emit laser light 212 along an axis that does not intersect the second axis 224. For instance, laser light source 210 may be arranged off-axis, tilted, or shifted away from the first axis 214 and/or the second axis 224. Such asymmetric arrangements may provide greater angle coverage and/or higher resolution coverage along one side of the mirror element 220 as compared to another side. In an example embodiment, the laser light source 210 may be positioned with respect to the mirror element 220 so as to provide greater angular coverage for a portion of the environment located within particularly desirable angular ranges (e.g., −45 degrees to +20 degrees from horizontal). Other arrangements of laser light source 210 and design considerations with regard to such arrangements are possible and contemplated herein.

Figure 4:
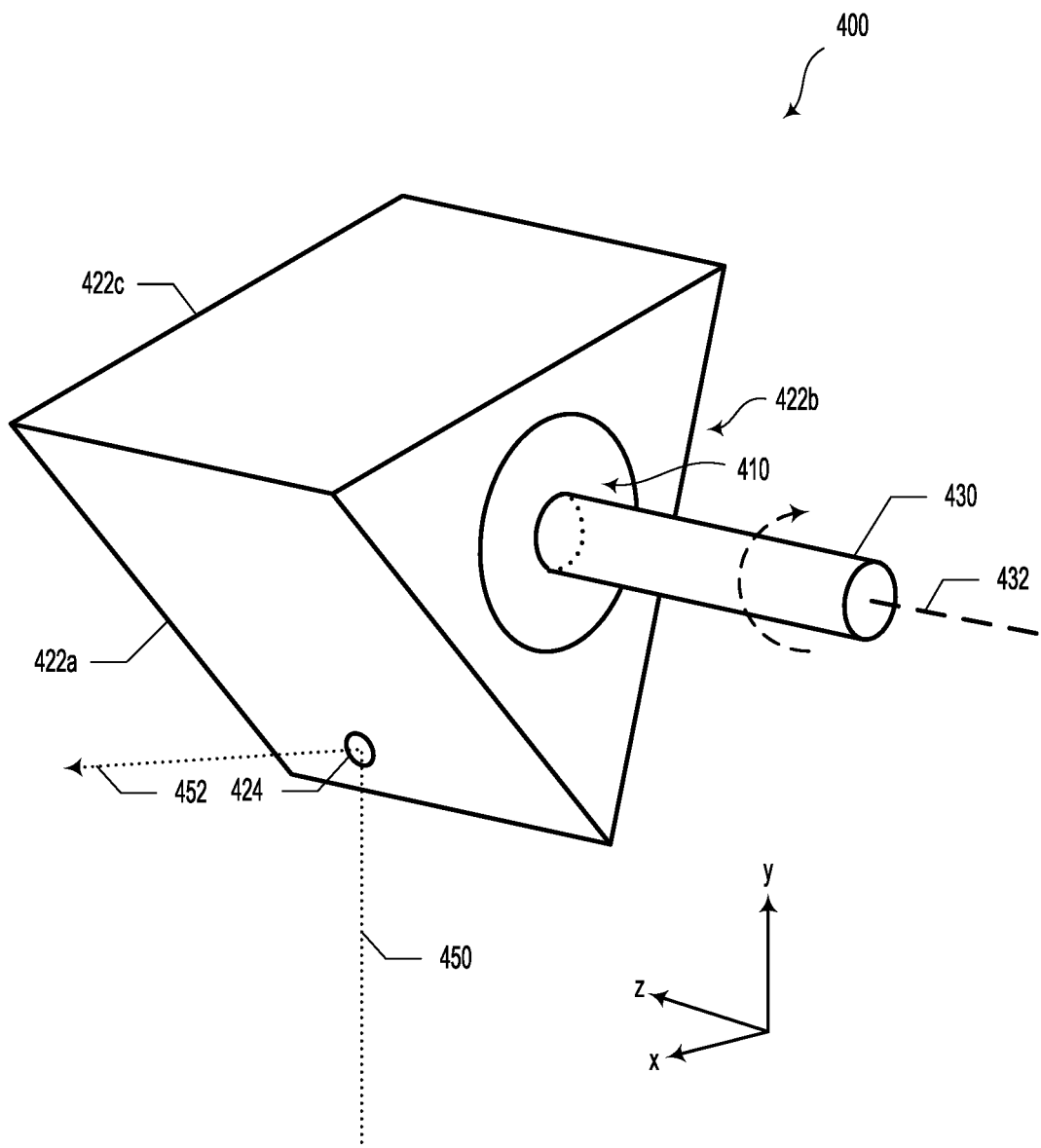
FIG. 4 illustrates a mirror element, according to an example embodiment.

FIG. 4 illustrates a mirror element 400, according to an example embodiment. Mirror element 400 may be similar to mirror elements 120 or 220 as illustrated and described with reference to FIGS. 1, 2A, 2B, 2C, 3A, and 3B. Mirror element 400 may include reflective surfaces 422a, 422b, and 422c. The reflective surfaces 422a, 422b, and 422c may be configured to be highly reflective for incident laser light 450 at or around a given emission wavelength. For example, the reflective surfaces 422a, 422b, and 422c may reflect more than 90% of incident light having an emission wavelength of 1.55 microns.

Mirror element 400 may additionally include a spindle 430. The mirror element 400 may be configured to rotate about the spindle 430, which may be along a rotational axis 432. The rotational axis 432 may be similar or identical to second axis 224 as illustrated in FIGS. 2A, 2B, 2C, 3A, and 3B and described elsewhere herein. Namely, spindle 430 and mirror element 400 may be configured to rotate in a clockwise and/or counter clockwise direction with respect to the rotational axis 432. In some embodiments, the spindle 430 may be rotated via a mirror element actuator (e.g., a DC motor or a stepper motor).

In some embodiments, the mirror element 400 may be hollow, at least in part. That is, at least some material in an inner portion 410 of the mirror element 400 may be removed. Namely, inner portion 410 may be empty or may include air.

As the mirror element 400 rotates about the rotational axis 432, incident light may be reflected from one or more reflective surfaces of the mirror element toward an environment of the mirror element 400. For example, as illustrated in FIG. 4, incident laser light 450 may interact with the first reflective surface 422a at an interaction location 424. An angle of incidence of the incident laser light 450 with respect to the reflective surface 422a may determine a reflectance angle for reflected light 452.

Figure 5:
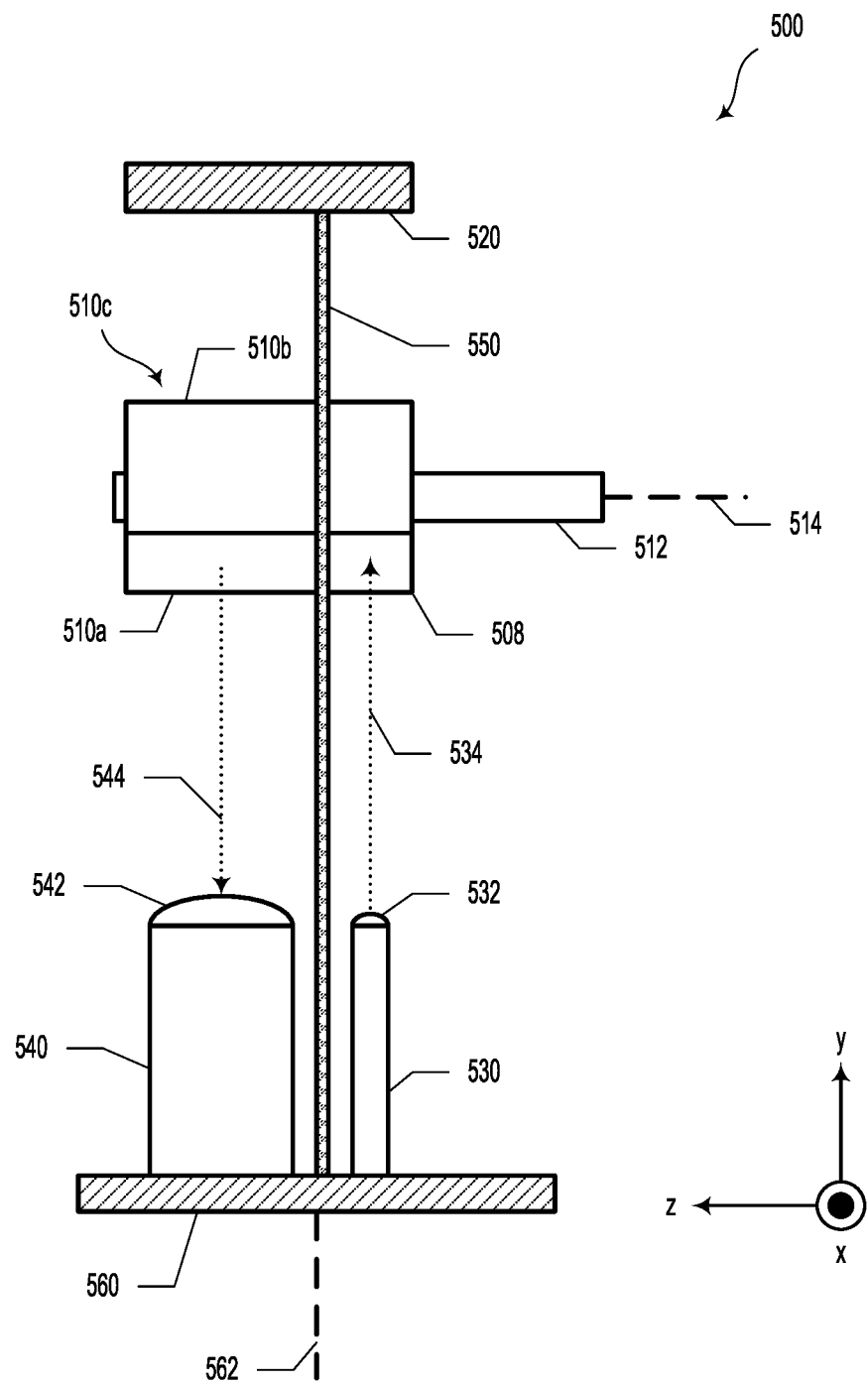
FIG. 5 illustrates an optical system, according to an example embodiment.

FIG. 5 illustrates an optical system 500, according to an example embodiment. The optical system 500 may be, at least in part, similar or identical to optical systems 200, 250, 260, and 300 and mirror element 400 as illustrated and described with regard to FIGS. 2A, 2B, 2C, 3A, 3B, and 4. For example, optical system 500 may include a mirror element 508 having reflective surfaces 510a, 510b, and 510c. The mirror element 508 may be coupled to spindle 512, which may be configured to rotate about an axis of rotation 514.

Similar to optical system 200, optical system 500 may include beam stop 520 and a laser light source 530. In an example embodiment, the laser light source 530 may emit laser light 534 via an optical element 532 (e.g., a lens and/or a diffuser). The emitted laser light 534 may interact with the reflective surface 510a and be reflected into the environment of the optical system.

The optical system 500 may also include an optical receiver 540. The optical receiver 540 may be configured to receive light 544 from the environment around the optical system 200 via an optical element 542 (e.g., a condenser lens). Based on the received light 544, the optical receiver 540 may provide information about a scene of the environment around the optical system 200. The optical receiver 540 may include a detector array. The detector array may include a plurality of single photon avalanche detectors (SPADs). Additionally or alternatively, the detector array may include other types of photodetectors configured to detect light 544.

The laser light source 530 and the portion of the mirror element 508 upon which the emitted laser light 534 is incident may be termed the transmit path. The portion of the mirror element 508 with which the received light 544 interacts and the optical receiver 540 may be termed the receive path. In embodiments illustrated herein, the transmit path and the receive path may be parallel. In such a scenario, the transmit path and receive path may be arranged so that a laser light pulse is transmitted into the environment, interacts with the environment (e.g., via reflection from an object) and is reflected back to the receiver. The transmit path and the receive path may be segregated to reduce noise and avoid cross talk and/or false signals. Accordingly, the optical system 200 may include a light baffle 550 that may be positioned between the transmit path and the receive path.

The optical system 500 may include a base portion 560 that may be coupled to the optical receiver 540, the laser light source 530, the beam stop 520, and an actuator configured to rotate the mirror element 508. Namely, the base portion 560 may be configured to rotate about a third axis 562, which may be parallel to the transmit path and/or the receive path.

III. Example Methods

Figure 6:
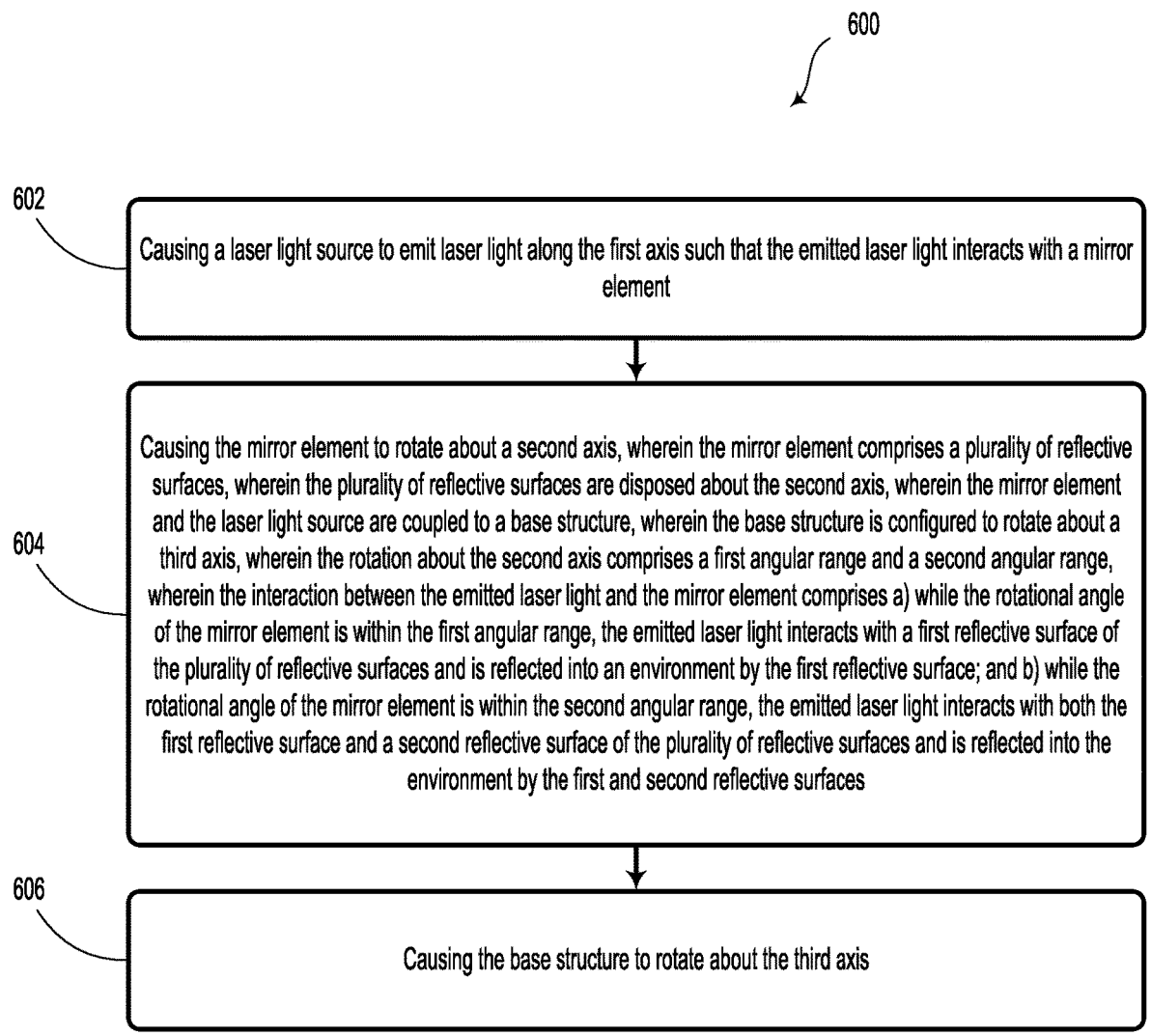
FIG. 6 illustrates a method, according to an example embodiment.

FIG. 6 illustrates a method 600, according to an example embodiment. Method 600 may include one or more steps or blocks, which may be carried out in any order. Furthermore, steps or blocks may be added or removed within the scope of the present disclosure. The steps or blocks of method 600 may be carried out once, continuously, periodically, or over discrete amounts of time.

Method 600 may include operations carried out entirely, or in part, by controller 150 as illustrated and described in reference to FIG. 1. Furthermore, method 600 may be carried out in association with, or by utilizing, some or all elements of system 100, optical systems 200, 250, 260, 300, or 500, or mirror element 400 as illustrated and described in reference to FIGS. 1, 2A, 2B, 2C, 3A, 3B, 4, and 5.

Block 602 includes causing a laser light source to emit laser light along the first axis such that the emitted laser light interacts with a mirror element.

Block 604 includes causing the mirror element to rotate about a second axis. The mirror element may rotate about the second axis at rotational frequency $\Omega$. In some embodiments, the mirror element may rotate about the second axis at a rotational frequency of about 30 kRPM. Other rotational frequencies of mirror element are possible. For example, the mirror element may rotate about the second axis within a rotational frequency range between 100 RPM and 100 kRPM.

In an example embodiment, the mirror element includes a plurality of reflective surfaces. Each of the plurality of reflective surfaces could be disposed about the second axis. The mirror element and the laser light source are coupled to a base structure. The base structure is configured to rotate about a third axis. In some embodiments, the base structure could be coupled to a vehicle (e.g., a semi- or fully-autonomous vehicle).

In some embodiments, the rotation of the mirror element about the second axis includes a first angular range and a second angular range. The interaction between the emitted laser light and the mirror element may be different based on whether the mirror element is within the first angular range or the second angular range. For example, while the rotational angle of the mirror element is within the first angular range, the emitted laser light may interact with only one reflective surface (e.g., a first reflective surface) of the plurality of reflective surfaces. In such a scenario, the laser light is reflected into an environment by the first reflective surface.

However, while the rotational angle of the mirror element is within the second angular range, the emitted laser light may interact with both the first reflective surface and a second reflective surface of the plurality of reflective surfaces. In such a scenario, the emitted laser light may be reflected into the environment by the first reflective surface and the second reflective surface.

Block 606 includes causing the base structure to rotate about the third axis. The base structure may rotate about the third axis at rotational frequency $\Phi$. As an example, the base structure may rotate about the third axis at a rotational frequency of about 600 RPM. Other rotational frequencies are possible. For instance, the base structure 130 may rotate about the third axis at rotational frequencies between 10 RPM and 10 kRPM.

In some embodiments, the method 600 may also include operating the optical system in an interlaced condition. In some embodiments, the interlaced condition may provide information about the environment with higher resolution (e.g., by utilizing interleaved scan points). In such scenarios, the interlaced condition may occur when $\Omega/\Phi=2N+1$, where N is an integer. An interlaced condition may provide a desired laser scanning pattern for scanning the three-dimensional environment around the optical system.

In some embodiments, the interlaced condition may provide for improved (e.g., safer, smoother, and/or more comfortable) operation of LIDAR-equipped vehicles at least because more closely spaced scan locations may allow easier detection of a small object at a given distance. For example, a non-interlaced condition may include scan locations that are spaced 4 inches from one another at a range of 10 feet. In an example embodiment, an interlaced condition may provide scan locations that are spaced 2 inches from one another at a range of 10 feet. It will be understood that other ways of interlacing or varying a set of scan locations between an initial scan and a subsequent scan so as to increase scanning resolution are contemplated herein.

In some embodiments, the interlaced condition may include a higher order interlacing scenario where it may take 3, 4, or more revolutions of the mirror element before a given scan location is "rescanned" with a laser light pulse. In such a scenario, $\Omega/\Phi=(N \times k)+1$, where N is an integer and k is the number of complete revolutions of the mirror element before a laser light pulse is emitted along the same axis with respect to the mirror element and/or the system generally.

In other embodiments, an irrational interlacing condition is possible. That is, the irrational interlacing condition could include a scenario in which the succession of laser light pulses is arranged such that pulses are never quite emitted along the same axis as prior pulses. In such a scenario, $\Omega/\Phi$ may be an irrational value (e.g., a value that cannot be expressed as a ratio of integers).

In an example embodiment, $\Omega/\Phi$ could be substantially equal to k+(1 over the golden ratio or golden mean, $\varphi$), where:

$$\varphi = \frac{1+\sqrt{5}}{2} = 1.6180339887\ldots$$

Other variants (e.g., $\Omega/\Phi=k-(1/\varphi)$ or $\Phi/\Omega=k\pm(1/\varphi)$) are possible and contemplated. It will be understood that $\Omega/\Phi$ or $\Phi/\Omega$ could be within 0.001%, 0.01%, 0.1%, or 1% of $k+(1/\varphi)$ or $k-(1/\varphi)$. While the golden ratio, $\varphi$, is described here, it will be understood that other irrational values are contemplated. For example, other irrational values that cause the interval between two consecutive scans to be quickly mapped out are contemplated and possible.

Additionally or alternatively, embodiments are contemplated where $\Omega/\Phi=k\pm p/q$, where 0<p/q<1, and where p/q is an irreducible fraction that has a large denominator and has multiples (e.g., having modular remainder of 1) that quickly map out the interval between 0 and 1. In operation, the scanning beam has a finite size (e.g., beam spot diameter), so an irrational value need not be used if p/q has a large enough denominator. In such scenarios, $\Omega/\Phi$ or $\Phi/\Omega$ could be within 0.001%, 0.01%, 0.1%, or 1% of k±p/q.

As described herein, quickly mapping out the space means that after n iterations, the biggest interval between points that have been mapped out is as close as possible to 1/n. Furthermore, a complete scan can be said to occur once 1/n is comparable to the beam spot diameter. It will be understood that other operational modes are possible for controlling how laser light pulses are emitted into the environment.

In some embodiments, certain operations of one or more systems described herein could be adjusted and/or (re-)configured in various ways. For example, the vertical field of view (e.g., corresponding to emission angle range 268 as illustrated and described in FIG. 2C) could be adjusted based on a given use case. In such scenarios, one or more operating parameters (e.g., laser pulse repetition rate, laser pulse timing, spin rate, etc.) could be controllably adjusted so as to provide a desired field of view, a desired point cloud density within a given field of view, and/or a desired spatial resolution. Accordingly, a single sensor system could be utilized for multiple purposes and/or use cases.

In some scenarios, such system adjustments and/or re-configurations could be performed without physically adjusting elements of the system. For example, in response to a desired point cloud density or desired resolution, a controller (e.g., controller 150) could be operable to adjust at least one of the laser pulse repetition rate, laser pulse intensity, laser pulse width, laser pulse timing, or spin rate about the first axis (e.g., first axis 214) and/or the second axis (e.g., second axis 224) so as to achieve the desired operating characteristics. As such, the controller could accept commands so as to temporarily (or permanently) adjust the horizontal field of view, vertical field of view, spatial resolution, point cloud refresh rate, and/or point cloud density, among other possibilities.

In example embodiments, the vertical field of view could be dynamically controlled to be: a) an approximately 90 degree field of view (e.g., an inclusive range of angles between approximately 15 degrees above horizontal to approximately 75 degrees below horizontal); b) an approximately 30 degree field of view (e.g., approximately 15 degrees above horizontal to approximately 15 degrees below horizontal); or c) a "split" field of view with a "dead" zone in the middle (e.g., a first inclusive range of angles between approximately 45 degrees above horizontal to approximately 15 degrees above horizontal and a second inclusive range of angles between approximately 15 degrees below horizontal to approximately 45 degrees below horizontal, with a dead zone in the middle). It will be understood that other variations in vertical and/or azimuthal field of view are possible and contemplated.

In some embodiments, systems and methods described herein could provide real-time information about a specific location within the point cloud. For example, a user interface associated with the system could include a "point selector" function, which could provide real-time information about at least one of: precise distance of multiple returns, signal amplitude (e.g., reflected pulse amplitude), height of a return, and/or reflectivity of a given point in the point cloud. For example, a user of the user interface could select a desired point in space or desired direction and the user interface could display real-time information about the desired specific location/direction. Other real-time data, e.g., other immediately useful data that may often entail additional work to calculate, could be provided by the systems and/or user interface described herein.

In some embodiments, the systems described herein could be embodied in a compact form factor (e.g., the size of a soda can or smaller) and/or could be provided as having light weight (e.g., approximately 300-400 grams or less). As described herein, various elements of the described systems could include lightweight plastic, aluminum, carbon fiber, composite materials, and/or other combinations of lightweight materials. Various components of the described systems could be selected and/or configured so as to reduce component weight and overall system weight. For example, portions of the housing, motors, bearings, and/or bearing preload components could be selected, designed, and/or configured so as to provide reduced weight. In some embodiments, the preload spring and/or preload distributor could be formed so as to have lower weight than conventional preload mechanisms. For example, the preload spring could have a flat serpentine shape and the preload distributor could have a disk-shaped rim portion configured to apply a preload force to an outer race of a bearing. Other components could be design, formed, and/or configured with reduced component weight as a primary consideration.

As described herein, at least some portion of a housing (e.g., housing 252) of the system could be configured to rotate with respect to other elements of the system and/or the environment. For example, at least a portion of housing 252 may rotate about the first axis 214. In such scenarios, the one or more moving portions of the system could be configured to stop or pause in response to an object contacting the housing. For example, the motor driving the moving portion of the housing 252 could include a low-torque motor. Additionally or alternatively, the moving portions of the systems could be configured to stop or pause in response to an intentional or inadvertent touch interaction. For example, if a human contacts the housing, a controller (e.g., controller 150) could be operable to cause the motor moving the housing to stop or pause. In some embodiments, the system could include a clutch, which could at least temporarily disengage mechanical power transmission between the motor and the housing in the event of such contact by an external body (e.g., a human, a rock, etc.).

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. A system comprising:
a light source operable to emit laser light along a first axis;
a mirror element comprising a plurality of reflective surfaces, wherein the mirror element is configured to rotate about a second axis at rotational frequency $\Omega$, wherein the plurality of reflective surfaces is disposed about the second axis, wherein the mirror element and the light source are coupled to a base structure, wherein the base structure is configured to rotate about a third axis at rotational frequency $\Phi$; and
a controller configured to carry out operations, the operations comprising:
causing the mirror element to rotate about the second axis and the base structure to rotate about the third axis such that $\Omega/\Phi$ corresponds to an interlaced condition, wherein the interlaced condition provides a desired laser scanning pattern in an environment of the system; and
causing the light source to emit laser light along the first axis such that the emitted laser light interacts with the environment of the system according to the desired laser scanning pattern.

2. The system of claim 1, wherein the interlaced condition comprises $\Omega/\Phi=2N+1$, where N is an integer.

3. The system of claim 2, wherein $\Omega/\Phi$ is substantially equal to $k\pm(1/\varphi)$, where k is an integer and $\varphi$ is the golden ratio.

4. The system of claim 1, wherein the desired laser scanning pattern corresponds to emitting laser light toward desired locations within a three-dimensional environment around the system.

5. The system of claim 1, wherein the interlaced condition provides a plurality of interleaved scan points.

6. The system of claim 5, wherein the interlaced condition and the corresponding plurality of interleaved scan points provides higher spatial resolution information compared to a non-interlaced condition.

7. The system of claim 1, wherein the emitted laser light is reflected into the environment through an emission angle range about the second axis, wherein the emission angle range is greater than 230 degrees.

8. The system of claim 1, wherein causing the mirror element to rotate about the second axis comprises causing the mirror element to rotate about the second axis at about 30 kRPM.

9. The system of claim 1, wherein causing the base structure to rotate about the third axis comprises causing the base structure to rotate about the third axis at about 600 RPM.

10. The system of claim 1, further comprising a vehicle, wherein the base structure is coupled to the vehicle.

11. The system of claim 1, wherein the system is part of a laser-based distance and ranging system.

12. A method comprising,
causing a light source to emit laser light along a first axis; and
causing a mirror element to rotate about a second axis at rotational frequency $\Omega$ and a base structure to rotate about a third axis at rotational frequency $\Phi$ such that $\Omega/\Phi$ corresponds to an interlaced condition, wherein the interlaced condition provides a desired laser scanning pattern in an environment, wherein the emitted laser light is reflected by the mirror element so as to interact with the environment according to the desired laser scanning pattern.

13. The method of claim 12, wherein the interlaced condition comprises $\Omega/\Phi=2N+1$, where N is an integer.

14. The method of claim 12, wherein $\Omega/\Phi$ is substantially equal to $k\pm(1/\varphi)$, where k is an integer and $\varphi$ is the golden ratio.

15. The method of claim 12, further comprising:
emitting the laser light toward desired locations within a three-dimensional environment.

16. The method of claim 12, wherein the interlaced condition provides a plurality of interleaved scan points.

17. The method of claim 16, wherein the interleaved condition and the corresponding plurality of interleaved scan points provides higher spatial resolution information compared to a non-interlaced condition.

18. The method of claim 12, wherein the emitted laser light is reflected into the environment through an emission angle range about the second axis, wherein the emission angle range is greater than 230 degrees.

19. The method of claim 12, wherein causing the mirror element to rotate about the second axis comprises causing the mirror element to rotate about the second axis at about 30 kRPM.

20. The method of claim 12, wherein causing the base structure to rotate about the third axis comprises causing the base structure to rotate about the third axis at about 600 RPM.

* * * * *